US008954083B1

(12) United States Patent
Yenney et al.

(10) Patent No.: US 8,954,083 B1
(45) Date of Patent: Feb. 10, 2015

(54) SYSTEM AND METHOD FOR PREVENTING OR ALLOWING OCCURRENCE OF A BASE STATION FUNCTION

(75) Inventors: Christopher Yenney, Ashburn, VA (US); Ryan S. Talley, Overland Park, KS (US); Bryan T. Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1828 days.

(21) Appl. No.: 11/936,583

(22) Filed: Nov. 7, 2007

(51) Int. Cl.
*H04W 16/18* (2009.01)

(52) U.S. Cl.
USPC ........ 455/446; 455/435.3; 455/436; 455/420; 455/421; 455/466; 455/456.1; 370/328; 370/329; 370/331; 370/338

(58) Field of Classification Search
CPC ..... H04W 16/18; H04W 36/30; H04W 64/00; H04W 4/14
USPC .............. 455/466, 436, 435.1, 517, 518, 519, 455/404.2, 412.1–412.2, 420, 421, 422.1, 455/424, 456.1, 456.3, 41.1, 525, 561; 370/329, 331, 328, 338
See application file for complete search history.

(56) References Cited

U.S. PATENT DOCUMENTS

| | | | |
|---|---|---|---|
| 5,745,523 A | 4/1998 | Dent et al. | |
| 5,909,381 A | 6/1999 | Shome et al. | |
| 6,088,589 A | 7/2000 | Valentine et al. | |
| 6,161,015 A * | 12/2000 | Birchler et al. | 455/440 |
| 6,198,432 B1 | 3/2001 | Janky | |
| 6,973,312 B1 * | 12/2005 | Ngan et al. | 455/442 |
| 6,985,731 B1 | 1/2006 | Johnson et al. | |
| 7,743,411 B2 * | 6/2010 | Ying et al. | 726/15 |
| 2002/0029258 A1 * | 3/2002 | Mousseau et al. | 709/218 |
| 2004/0203908 A1 * | 10/2004 | Hind et al. | 455/456.1 |
| 2005/0026649 A1 * | 2/2005 | Zicker et al. | 455/552.1 |
| 2005/0048976 A1 * | 3/2005 | Kalhan et al. | 455/440 |
| 2005/0144647 A1 | 6/2005 | Zussman et al. | |
| 2006/0083199 A1 | 4/2006 | Yang | |
| 2006/0092890 A1 * | 5/2006 | Gupta et al. | 370/338 |
| 2006/0116127 A1 | 6/2006 | Wilhoite et al. | |
| 2006/0121916 A1 | 6/2006 | Aborn et al. | |
| 2006/0128384 A1 | 6/2006 | Jagadeesan et al. | |

(Continued)

OTHER PUBLICATIONS

Samsung Telecommunications Systems, Products & Solution—Mobile, CDMA UbiCell, downloaded from the World Wide Web on Aug. 22, 2007.

(Continued)

*Primary Examiner* — Babar Sarwar (57) ABSTRACT

A method, system, and computer-readable medium for preventing or allowing a base station (BS) to perform a particular BS function are described. The BS and/or a base station controller (BSC) determine and compare a location of the BS to respective location(s) of one or more other BSs. The BS and/or BSC determine whether the BS location is at least a threshold distance respectively from each of one or more other BSs. If the BS location is at least a threshold distance respectively from each of one or more other BSs, the BS and/or BSC sets at least one parameter to prevent the BS from performing the particular BS function. If the BS location is less than the threshold distance respectively from at least one of the one or more other BSs, the BS and/or BSC sets at least one parameter to allow the BS to perform the particular BS function.

26 Claims, 4 Drawing Sheets

(56) References Cited

U.S. PATENT DOCUMENTS

| | | | |
|---|---|---|---|
| 2006/0217112 | A1 | 9/2006 | Mo |
| 2007/0047516 | A1 | 3/2007 | Kottilingal |
| 2007/0097983 | A1 | 5/2007 | Nylander et al. |
| 2007/0105527 | A1 | 5/2007 | Nylander et al. |
| 2007/0155381 | A1* | 7/2007 | Alberth et al. ............. 455/432.1 |
| 2007/0156804 | A1 | 7/2007 | Mo |
| 2007/0183427 | A1 | 8/2007 | Nylander et al. |
| 2007/0258417 | A1* | 11/2007 | Harvey et al. ................. 370/338 |
| 2009/0059822 | A1 | 3/2009 | Morrill et al. |

OTHER PUBLICATIONS

Trimble Navigation Limited, Samsung Selects Trimble's GPS Timing Solution for Its Ubicell System, downloaded from the World Wide Web on Aug. 22, 2007.

Wikipedia, Femtocell, downloaded from the World Wide Web on Aug. 22, 2007.

Eric Zeman, Ubi, I Be, We Be Screaming for Samsung's UbiCell Femtocell, Information Week.com, Mar. 30, 2007.

PR Newswire, Samsung Telecommunications America, LLC, Samsung Introduces CDMA Base Station for Home Coverage at CTIA Wireless 2007, Mar. 26, 2007.

Engage Communication, Cellular Backhaul Over IP/Ethernet, downloaded from the World Wide Web on Sep. 28, 2007.

Nortel, This is the Way, BSC and TCU 3000 Cost-Efficiently Address GSM Densification and Evulution Market Needs, May 9, 2005.

Sprint, Sprint Airave, Quick Start Guide, downloaded from the World Wide Web on Sep. 21, 2007.

Sprint Nextel, Sprint Airave User Guide, downloaded from the World Wide Web on Sep. 21, 2007.

Paula Bernier, Home Base, Virgo Publishing, May 30, 2007, downloaded from the World Wide Web on Aug. 22, 2007.

Chris Ziegler, engadget.com, Hands-on with Samsung Ubicell, Mar. 28, 2007, downloaded from the World Wide Web on Aug. 22, 2007.

Brad Kellett, mobileburn.com, Samsung Launches the UbiCell from CTIA, Apr. 5, 2007.

Rupert Baines, VP Marketing, picoChip Flexible Wireless, The Need for WiMAX picocell & Femtocells, Mar. 5, 2007.

Sprint Nextel, Sprint Airave—Experience Life at Sprintspeed, downloaded from the World Wide Web at http://airave.sprint.com/index.html on Sep. 21, 2007.

U.S. Appl. No. 12/021,325, entitled system and method for determining whether to allow a base station to perform a particular base station function, filed Jan. 29, 2008.

* cited by examiner

SYSTEM AND METHOD FOR PREVENTING OR ALLOWING OCCURRENCE OF A BASE STATION FUNCTION

BACKGROUND

1. Cellular Wireless Networks and Macro Base Stations

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), and/or any others.

These networks typically provide services such as voice, Short Message Service (SMS) messaging, and packet-data communication, among others, and typically include a plurality of base stations, each of which provide one or more coverage areas, such as cells and sectors (i.e., individual areas of a cell that allow the cell to carry more calls). When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro base stations," and the network they collectively form—or to which they collectively belong—is referred to generally and herein as the "macro-network."

Mobile stations and macro base stations conduct communication sessions (e.g. voice calls and data sessions) over a frequency known as a carrier, which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station assigned to a given sector/carrier to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Femtocell Base Stations

Many macro-network subscribers, including private consumers and small businesses, among others, in addition to having wireless service (which may include data service) for their mobile station(s), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to the cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to laptop computers, digital video recorders (DVRs), appliances, and/or any other computing devices or their wireless network adapters.

To address gaps in macro-network coverage (e.g. poor in-building coverage) and for other reasons, macro-network service providers have recently begun offering consumers devices referred to herein as femtocell base stations, which may also be referred to as femtocells (femto base stations, femto base transceiver stations (BTSs)), picocells (pico base stations, pico BTSs), ubicells, microcells (micro base stations, micro BTSs), and perhaps by other names. Note that the aforementioned terms that end in "cell" may also be generally and herein used interchangeably with the coverage area provided by the respective devices.

A typical femtocell base station may be approximately the size of a desktop phone or WiFi access point, and is essentially a low-power, low-capacity, low-cost version of a macro base station. Thus, a typical femtocell base station will use a normal power outlet, perhaps with a transformer providing a DC power supply. The femtocell base station may have a wired (e.g. Ethernet) or wireless (e.g. WiFi) connection with the user's router, and would thus have connectivity to the Internet and/or one or more other packet-data networks via the user's broadband connection. A femtocell base station may establish a virtual-private-network (VPN) connection over the Internet with an entity (e.g. a VPN terminator) on the wireless-service provider's core network, and thereby be able to securely communicate with the VPN terminator and other entities on that core network and beyond.

The femtocell base station also has a wireless-communication (e.g. CDMA) interface that is compatible with the user's mobile station(s), such that the femtocell base station may act as a micro base station, providing coverage on the wireless-service provider's network via the user's Internet connection. Usually, a femtocell base station will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the femtocell base station. And femtocell base stations typically include a Global Positioning System (GPS) receiver for use in receiving and decoding GPS signals, for use in determination of location, as well as for use in synchronizing operations with other femtocell base stations and with the macro-network, based on timing information embedded in GPS signals. Typically, femtocell base stations have fairly comprehensive auto-configuration capabilities, such that they are largely "plug-and-play" to the user.

3. Licensed Frequency Spectrum

Various government agencies, such as the Federal Communications Commission (FCC) in the United States, regulate the use of radio spectrum. The regulation of radio spectrum may include licensing the radio spectrum to a limited number of entities. The regulation of radio spectrum may also include imposing penalties, such as imposing a monetary fine or revoking a license, to an unlicensed entity that interferes with the radio spectrum of a licensed entity.

A wireless service provider that operates a macro-network is typically the holder of a plurality of radio spectrum licenses that authorize the service provider to provide wireless service via its licensed radio spectrum. The licensed radio spectrum of a given wireless service provider may cover a distinct geographical area. If the given wireless service provider is found to interfere with licensed radio spectrum outside its distinct geographical area (e.g., by providing wireless service outside its distinct geographical area), the regulating government agency may penalize the given wireless service provider. Thus, wireless service providers strive to avoid interfering with radio spectrum outside the distinct geographical area where they are licensed to provide wireless service.

OVERVIEW

The present invention provides a method, system, and computer-readable medium for preventing a given base station from performing a particular base station function and/or for allowing the given base station to perform the particular base station function.

In one respect, an exemplary embodiment of the present invention may take the form of a method that includes (i) determining a location of a given base station, and (ii) determining that the location of the given base station is at least a threshold distance respectively from each of one or more other base stations, and responsively setting at least one parameter to prevent the given base station from performing a particular base station function.

In another respect, an exemplary embodiment of the present invention may take the form of a base station controller including: (i) a communications interface for communicating with a given base station, (ii) a processor, and (iii) data storage. The data storage may contain data indicating a threshold distance, data indicating a respective location of one or more other base stations, and computer-readable program instructions executable by the processor to determine that the location of the given base station is at least the threshold distance from each of the one or more other base stations, and to responsively cause at least one parameter to be set so as to prevent the given base station from performing a particular base station function.

In yet another respect, an exemplary embodiment of the present invention may take the form of a base station comprising: (i) a global positioning system receiver to determine a location of the base station, (ii) a processor, (iii) data storage containing at least one parameter settable to prevent the base station from performing a particular base station function and settable to allow the base station to perform the particular base station function, and computer-readable program instructions executable by the processor to set the parameter, and (iv) a communications interface to (a) transmit data indicating the location of the base station to a base station controller, (b) if the base station controller determines that the location of the given base station is at least a threshold distance respectively from each of one or more other base stations, receive from the base station controller a message that causes the processor to execute the program instructions to set the parameter to prevent the base station from performing the particular base station function, and (c) if the base station controller determines that the location of the given base station is less than the threshold distance respectively from at least one of the one or more other base stations, receive from the base station controller a message that causes the processor to execute the program instructions to set the at least one parameter to allow the base station to perform the particular base station function.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

Reference numerals are shown in the drawings to identify various elements of the drawings. Drawing elements having identical reference numerals are substantially identical or identical elements.

DETAILED DESCRIPTION

1. Introduction

The present invention provides a method, system, and computer-readable medium for preventing a given base station from performing a particular base station function and/or for allowing the given base station to perform the particular base station function. The given base station may be prevented from performing the particular base station function when the location of the given base station is determined to be at least a threshold distance respectively from each of one or more other base stations. On the other hand, if the given base station is determined to be at a location that is less than the threshold distance respectively from at least one of the one or more other base stations, the given base station may be allowed to perform the particular base station function.

In accordance with an exemplary embodiment of the present invention, the one or more other base stations may comprise some or all of the macro base stations within a macro-network operated by a given wireless service provider. The macro-network may provide wireless service to a geographical area where the given wireless service provider is licensed to provide wireless service. The given base station may comprise a femto-cell base station or another type of base station. The particular base station function may comprise (i) a function that allows a mobile station to establish a data session via the given base station, and/or (ii) another function.

In one respect, the given base station may make the determination whether its location is less than the threshold distance respectively from each of the one or more other base stations. In accordance with this embodiment, the given base station may comprise data storage containing data indicating the respective location of the one or more other base stations and data indicating the threshold distance. The given base station may determine its location and thereafter make the determination whether its location is less than the threshold distance respectively from each of the one or more other base stations.

In another respect, a base station controller that controls the given base station may make the determination whether the location of the given base station is less than the threshold distance respectively from each of the one or more other base stations. The base station controller may comprise data storage containing data indicating the respective location of the one or more other base stations and data indicating the threshold distance. The given base station may provide the base station controller with data that indicates the location of the given base station so that the base station controller can make the determination.

2. Exemplary Architecture

Figure 1:
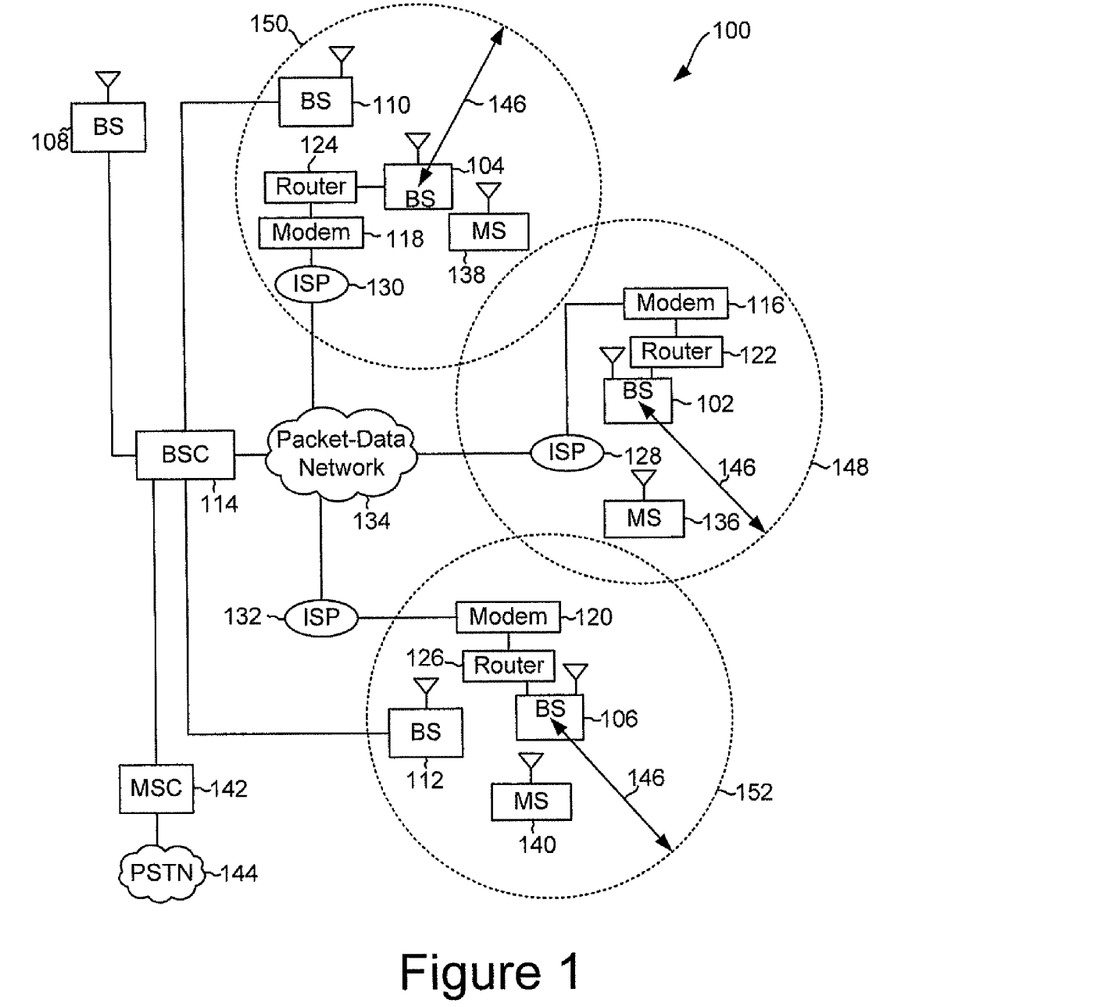
FIG. 1 is a block diagram of a system in which an exemplary embodiment may be implemented.

FIG. 1 is a block diagram of a system, in accordance with exemplary embodiments of the present invention. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location. Various functions described herein as being performed by one or more entities may be carried out by any suitable combination of hardware, firmware, and/or software. Various functions may be carried out by a processor executing computer-readable program instructions contained in data storage.

As shown in FIG. 1, a system 100 includes base stations 102, 104, 106, 108, 110, 112, a base station controller (BSC) 114, modems 116, 118, 120, routers 122, 124, 126, Internet service providers (ISPs) 128, 130, 132, a packet-data network 134 (e.g., the Internet), mobile stations 136, 138, 140, a mobile switching center (MSC) 142, and a public switched telephone network (PSTN) 144. The MSC 142 is a switch that provides the BSC 114 with connectivity to the PSTN 144.

The BSC 114 interfaces to base stations 108, 110, 112 and the MSC 142 via circuit-switched lines and/or via another means, such as the packet-data network 134. In turn, the BSC 114 interfaces to base stations 102, 104, 106 via the packet-data network 134.

For purposes of example in this description, base stations 102, 104, 106 are femtocell base stations, and base stations 108, 110, 112 are macro base stations. The base stations 102, 104, 106, may each comprise some or all of the elements of an AIRAVE base station manufactured by Samsung Telecommunications America, LLC, Richardson, Tex.

In accordance with an exemplary embodiment of the present invention, (i) a wireless service provider operates macro base stations 108, 110, 112, BSC 114, and MSC 142, and (ii) one or more customers (users) of the wireless service provider use the femtocell base stations 102, 104, 106 and mobile stations 136, 138, 140. The wireless service provider may be licensed by the Federal Communications Commission (FCC) to operate base stations 108, 110, 112 within certain designated areas within the United States. Hereinafter, these designated areas are referred to as "licensed areas." In order to avoid violating its license, the wireless service provider may operate base stations 108, 110, 112 such that base stations 108, 110, 112 do not transmit RF signals beyond the licensed areas.

For purposes of this description, the term "one or more other base stations" will refer to base stations 108, 110, 112. However, in carrying out the invention, one of ordinary skill in the art will realize that the "one or more base stations" referred to in this description may comprise a number of base stations greater than or less than three base stations.

Various communication paths may be defined by the elements shown in FIG. 1. For example, router 122, modem 116, ISP 128, and packet-data network 134 may define a first communication path between the BS 102 and the BSC 114. Similarly, router 124, modem 118, ISP 130, and packet-data network 134 may define a second communication path between the BS 104 and the BSC 114, and router 126, modem 120, ISP 132, and packet-data network 134 may define a third communication path between the BS 106 and the BSC 114. The first communication path, the second communication path, and the third communication path may each include other elements, such as a packet-data serving node (PDSN) located between the BSC 114 and the packet-data network 134. These other elements are not shown for clarity of the figure.

Various elements of these communication paths may be located within an indoor premises, such as a house, an office, a hospital, a factory, or some other indoor premises. For example, BS 102, router 122, modem 116, and mobile station (MS) 136 may be located within an indoor premises. In this way, BS 102 may provide a wireless coverage area within the indoor premises, and MS 136 may send communications to and receive communications from the BS 102 when the MS 136 is located within the wireless coverage area provided by the BS 102.

Additionally, more than one base station may communicate with the BSC 114 via a given communication path. For example, BS 106 may be moved to a location within the indoor premises including BS 102 such that the BS 102 and the BS 106 communicate with the BSC 114 via the first communication path.

Modems 116, 118, 120 may each comprise a broadband cable modem, a digital subscriber line (DSL) modem, a broadband over power line modem, or another type of modem. The ISPs 128, 130, 132 may each comprise a modem to communicate with modems 116, 118, 120, respectively. In an alternative embodiment, two or more of the modems 116, 118, 120 may connect to the same ISP (e.g., ISP 128). The ISPs 128, 130, 132 each provide an interface to the packet-data network 134. Modems 116, 118, 120 may interface to ISPs 128, 130, 132 respectively via coaxial cable, a hybrid-fiber-coaxial (HFC) network, an electrical power line, or some other means.

The routers 122, 124, 126 may each perform network address translation for BS 102, BS 104, and BS 106, respectively. The routers 122, 124, 126 may each comprise a router that interfaces to a respective modem and a respective base station via Category 5 (CAT 5) cables or via another means. The routers 122, 124, 126 may each comprise a Wireless-G Broadband Router, model number WRT54G manufactured by Linksys®, a division of Cisco Systems, Inc. of Irvine, Calif., or another router. Alternatively, a router (e.g., router 122) and a modem (e.g., modem 116) may be an integral unit, such as the Wireless-G Cable Gateway Cable Modem with Built-in Wireless G Router, model number WCG200 manufactured by Linksys®.

Each of the mobile stations 136, 138, 140 may be any of a variety of mobile stations, such as (i) a cellular phone, (ii) a personal digital assistant (PDA), (iii) a desktop or laptop computer including a wireless network interface card for communicating with a base station, or (iv) another type of mobile station. Each mobile station may communicate via a femtocell base station when that mobile station is located within a coverage area provided by the femtocell base station. As an example, this coverage area may be limited to an area within an indoor premises where the femtocell base station is located. Other examples of the femtocell base station coverage area are also possible.

Additionally, each MS may communicate via a macro base station when that MS is located within a coverage area provided by the macro base station. As an example, the macro base station coverage area may include an area outside of the indoor premises where the femtocell base station is located. The exemplary base station coverage area may also include at least a portion of the indoor premises. Other examples of the macro base station coverage area are also possible.

Each of the base stations 108, 110, 112 is associated with a threshold distance 146. The threshold distance 146 may be any one of a variety of defined distances. For instance, the threshold distance 146 may be 5.0 kilometers (km), a distance greater than 5.0 km, or a distance less than 5.0 km.

The threshold distance 146 may be defined in various ways. For example, the threshold distance 146 may be defined as (i) a distance between a macro base station (e.g., BS 110) and the furthest location away from the BS 110 that an RF signal broadcast by BS 110 is receivable at or above a threshold power level, (ii) a radius of a wireless coverage area provided by a macro base station, (iii) an average radius of the wireless coverage area provided by each macro base station within a macro-network, or (iv) a shortest or longest radius of a wireless coverage area provided by a macro base station within the macro-network. Other examples of defining the threshold distance 146 are also possible.

Alternatively, the base stations 108, 110, 112 may be associated with respective threshold distances. In this way, base station 108 may be associated with a threshold distance equal to a first distance (e.g., 6.0 km), base station 110 may be associated with a threshold distance equal to a second distance (e.g., 6.5 km), and base station 112 may be associated with a threshold distance equal to the first distance, the second distance, or a third distance (e.g., 7.0 km).

The threshold distance 146 may be used to define areas 148, 150, 152 that surround the base stations 102, 104, 106, respectively. If the BS 102 (i) makes the determination whether its location is at least a threshold distance respectively from each of one or more other base stations, and (ii) makes the determination whether its location is less than the threshold distance respectively from each of the one or more other base stations, the BS 102 may make these determinations, in part, by determining whether any of the one or more other base stations 108, 110, 112 are located within the area 148.

Similarly, if the BSC 114 (i) makes the determination whether the location of BS 102 is at least a threshold distance respectively from each of one or more other base stations, and (ii) makes the determination whether the location of BS 102 is less than the threshold distance respectively from each of the one or more other base stations, the BSC 114 may make these determinations, in part, by determining whether any of the one or more other base stations 108, 110, 112 are located within the area 148.

Figure 2:
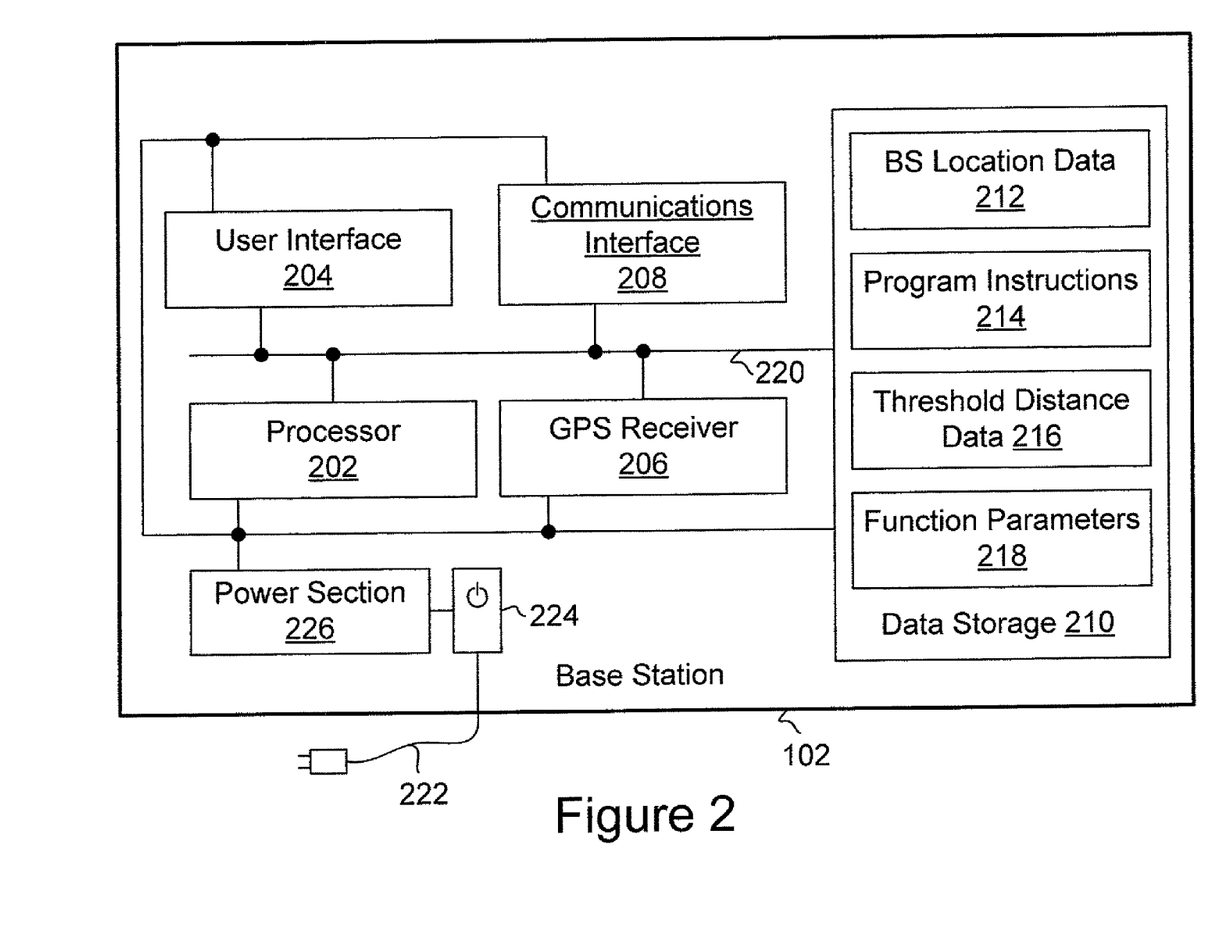
FIG. 2 is a block diagram of an exemplary embodiment of a base station in accordance with the present invention.

Next, FIG. 2 is a block diagram depicting details of BS 102 according to an exemplary embodiment of the present invention. One or more of the other base stations shown in FIG. 1 may be arranged as BS 102. For example, BS 104 and BS 106 may each be arranged as the base station shown in FIG. 2.

As shown in FIG. 2, BS 102 includes a processor 202, a user interface 204, a global positioning system (GPS) receiver 206, a communications interface 208, and data storage 210, all linked together via a system bus, network, or other connection mechanism 220. Data storage 210 may contain base station location data 212, computer-readable program instructions 214, threshold distance data 216, and function parameters 218. Data storage 210 may contain other data as well.

The processor 202 may comprise one or more general purpose processors (e.g., INTEL microprocessors) and/or one or more special purpose processors (e.g., digital signal processors). The processor 202 may execute the computer-readable program instructions 214.

The user interface 204 allows a person, e.g., a user of the BS 102 and/or an employee of the wireless service provider, to enter data into the BS 102. As an example, the enterable data may include threshold distance data 216, BS location data 212, and/or some other data. Use of the user interface 204 to enter particular data, such as the threshold distance data 216 and the BS location data 212, may be restricted to certain people, such as employees of the wireless service provider, so that the user of the BS 102 cannot modify the particular data stored at data storage 210. Without such a restriction, the user may modify the particular data so as to enable the BS 102 to perform the particular base station function under conditions in which the BS 102 is not supposed to perform the particular base station function.

In an alternative embodiment, the BSC 114 may contain the particular data instead of the BS 102 such that the user of the BS 102 would not have the ability to modify the particular data via the user interface 204.

The user interface 204 may be arranged in any of a variety of configurations to present data to a user of BS 102. Presenting data to the user may include presenting the user with notification of a given condition. For instance, the given condition may be that BS 102 is powered on, BS 102 can perform a particular base station function, BS 102 cannot perform the particular base station function, or some other condition. The user interface 204 may comprise: (i) a loud speaker (i.e., an electromechanical transducer that converts an electrical signal into sound) to present data audibly to a user, and/or (ii) a display, such as a liquid crystal display (LCD) or a light emitting diode (LED), to present data visually to the user.

The GPS receiver 206 is operable to determine a location of BS 102 and to send to the processor 202 and/or to the data storage 210 data indicating the determined location of BS 102. The GPS receiver 206 may include any of a variety of GPS integrated circuits known to those of ordinary skill in the art. For example, GPS receiver 206 may include a MAX2740 integrated circuit manufactured by Maxim Integrated Products, Sunnyvale, Calif.

The communications interface 208 may be arranged in various configurations. For example, the communications interface 208 may comprise an Ethernet interface that provides a wired packet-data interface for communicating with a device such as a router 122 or cable modem 116, and in turn, the BSC 114 or some other entity. As another example, the communications interface 208 may include an RF interface including one or more antennas, one or more chipsets, a set of one or more channel elements, and/or one or more other components suitable for providing a wireless coverage area to a wireless-communication protocol such as CDMA. A mobile station (e.g., MS 136) may communicate with a base station (e.g., BS 102) via an RF interface.

The communications interface 208 may transmit data to various devices, such as the BSC 114 and/or one or more mobile stations. As an example, the communications interface 208 (e.g., an Ethernet interface) may transmit to the BSC 114 a message including data that indicates the location of the BS 102. As another example, the communications interface 208 (e.g., an RF interface) may transmit to the MS 136 a message that indicates whether the BS 102 can perform the particular base station function. In response to receiving this message, a user interface of the MS 136 may present notification that indicates whether the base station 200 can perform the particular base station function.

The communications interface 208 may receive data from various devices, such as the BSC 114 and/or one or more mobile stations. As an example, the communications interface 208 may receive from the BSC 114 (i) a message to request that the BS 102 provide data that indicates the location of the BS 102, (ii) a message providing a threshold distance to be stored as the threshold distance data 216, (iii) a message providing data indicating the location of the one or more other base stations, (iv) a message including data for a data session that is being carried out via the BS 102, and/or (v) some other type of message.

As another example, the communications interface 208 may receive from the BSC 114 a message that causes the processor 202 to execute program instructions to set at least one parameter to prevent BS 102 from performing the particular base station function. The communications interface 208 may receive this message in response to the BSC 114 determining that the location of the BS 102 is at least a threshold distance respectively from each of the one or more other base stations.

As yet another example, the communications interface 208 may receive from the BSC 114 a message that causes the processor 202 to execute program instructions to set the at least one parameter to allow the BS 102 to perform the particular base station function. The communications interface 208 may receive this message in response to the BSC 114 determining that the location of the BS 102 is less than a threshold distance respectively from at least one of the other base stations.

As still yet another example, the communications interface 208 may receive from the MS 136 data carried over a traffic channel and/or data carried over a data channel. This data may be received during a data session established via the BS 102 when the at least one parameter is set to allow the BS 102 to perform the particular base station function. The communications interface 208 may transmit the received data to the BSC 114 via the first communication path.

The data storage 210 comprises a computer-readable storage medium readable by the processor 202. The computer-readable storage medium may comprise volatile and/or non-volatile storage components, such as optical, magnetic, organic or other memory or disc storage, which can be integrated in whole or in part with the processor 202. Alternatively, the entire computer-readable storage medium may be remote from the processor 202 and the processor 202 may communicate with the remote computer-readable storage medium via the connection mechanism 220.

The base station location data 212 may include data that indicates the location of BS 102 and/or data that indicates each location of one or more other base stations (e.g., macro base stations 108, 110, 112). The GPS receiver 206 and/or the processor 202 may provide data that indicates the location of BS 102 to the data storage 210 for storage as base station location data 212. The communications interface 208, the user interface 204, and/or the processor 202 may provide data that indicates each location of one or more other base stations to the data storage 210 for storage as base station location data 212.

The program instructions 214 comprise computer-readable program instructions executable by the processor 202. As an example, the program instructions 214 may comprise instructions that cause data storage 210 to store the BS location data 212, threshold distance data 216, and the function parameters 218. As another example, the program instructions 214 may comprise instructions that cause data storage 210 to modify the BS location data 212, the threshold distance data 216, and/or the function parameters 218. As yet another example, the program instructions 214 may comprise instructions for determining the location of the BS 102 and for determining whether the location of the BS 102 is at least a threshold distance respectively from the respective locations of each of the one or more other base stations.

As still yet another example, the program instructions 214 may comprise instructions that cause the processor 202 to detect when the BS 102 has changed from a power-off mode to a power-on mode, and to responsively cause the communications interface 206 to transmit at least a portion of the BS location data (e.g., data indicating the location of the BS 102) to the BSC 114. Since a femtocell base station may be easily moved from one location to another location, these program instructions may be executed each time the BS 102 is moved from one location to another location and power is connected to the BS 102 at the other location.

The threshold distance data 216 may comprise data that indicates a single threshold distance, such as threshold distance 146. Alternatively, the threshold distance data 216 may comprise a plurality of threshold distances, such as a threshold distance associated with BS 108 and a threshold distance associated with base stations 110, 112.

The function parameters 218 may comprise any of a variety of parameters. For example, the function parameters 218 may comprise one or more parameters to indicate whether the BS 102 is powered on and/or to indicate whether a wireless service provider has been notified of the BS location after the BS 102 has changed to a power-on mode. As another example, the function parameters may comprise one or more parameters settable to prevent the BS 102 from performing a particular base station function and settable to allow the BS 102 to perform the particular base station function. The program instructions 214 may comprise instructions that prevent the BS 102 from performing the particular base station function when the one or more parameters are set to prevent the BS 102 from performing the particular base station function.

As an example, the particular base station function may comprise a function that allows a mobile station to establish a data session (e.g., a voice call or a point-to-point protocol (PPP) data session) via the BS 102. The voice call, for instance, may occur in response to the mobile station sending an initial access message to the particular base station so as to call a phone number (e.g., *94) associated with an AM or FM broadcast radio station located near the one or more other base stations. In this regard, the one or more other base stations may be located within the coverage area of the AM or FM broadcast radio station.

As another example, the particular base station function may comprise a registration function that allows a mobile station to notify a home agent of the location of the mobile station so that the home agent may route data packets through foreign agents.

As yet another example, the particular base station function may comprise transmitting an operational carrier and/or a pilot beacon from the base station. The operational carrier may carry traffic channels for voice and/or data communications. Other examples of the particular base station function are also possible.

The BS 102 may also include a power cord 222, a power switch 224, and a power section 226. A first end of the power cord is connectable to a power outlet, such as a typical power outlet to which the BS 102 may be connected to receive a 60 hertz (Hz.) alternating electrical power input with a voltage level of approximately 110 to 120 volts. Other examples of the power input received from the power outlet are also possible. A second end of the power cord may be connected to the power switch 224. The power switch 224 may be toggled to supply or to cut off the supply of electrical power to the power section 226. The power section 226 may include circuitry in accordance with any of a variety of power supply circuits, such as a power supply circuit that may be used to provide electrical power to the processor 202, the user interface 204, the GPS receiver 206, the communications interface 208, and the data storage 210.

Figure 3:
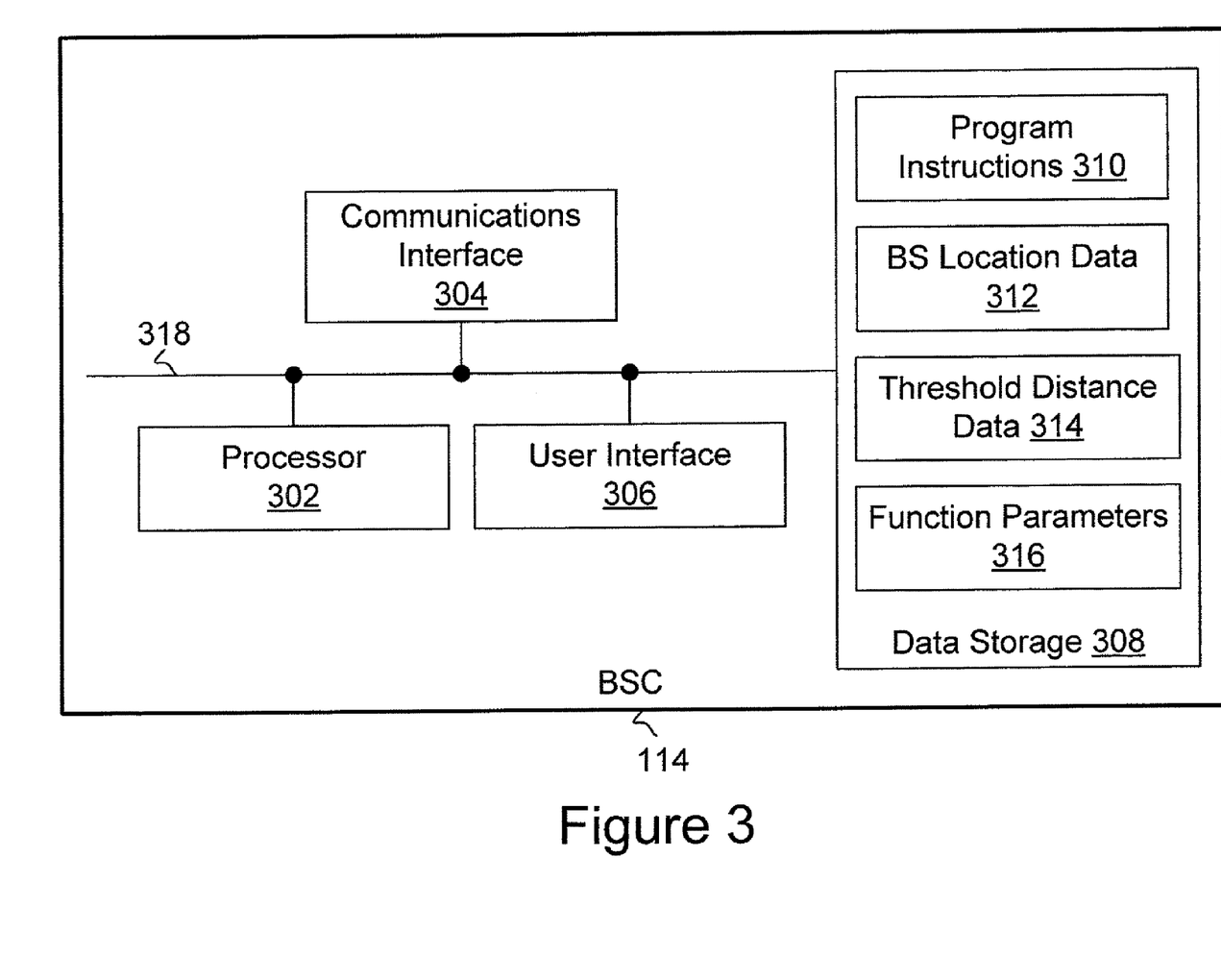
FIG. 3 is a block diagram of an exemplary embodiment of a base station controller in accordance with the present invention.

Next, FIG. 3 depicts a block diagram depicting details of the BSC 114 according to an exemplary embodiment of the present invention. As shown in FIG. 3, BSC 114 includes a processor 302, a communications interface 304, a user interface 306, and data storage 308, all of which may be linked together via a system bus, network, or other connection mechanism 318. Data storage 308 may contain computer-readable program instructions 310, base station location data 312, threshold distance data 314, and function parameters 316. Data storage 308 may contain other data as well.

The processor 302 may comprise one or more general purpose processors (e.g., INTEL microprocessors) and/or one or more special purpose processors (e.g., digital signal processors). The processor 302 may execute the computer-readable program instructions 310.

The communications interface 304 may comprise one or more interfaces to carry out communications between the BSC 114 and one or more base stations (such as the BS 102) via a communication path, such as the communication path between BS 102 and the BSC 114. As an example, the communications interface 304 may comprise an Ethernet interface that connects to T1/E1 or 10/100 Base T lines of the packet-data network 134.

The communications interface 304 may comprise one or more interfaces to carry out communications between the BSC 114 and the MSC 142. As an example, the communications interface 304 may comprise an interface to circuit-switched lines that are routed between the BSC 114 and the MSC 142.

The user interface 306 allows data to be entered into the BSC 114. For example, the user interface 306 may allow an employee of a wireless service provider to enter any of the data storable in data storage 308, such as a threshold distance storable as the threshold distance data 314. In this regard, the wireless service provider employee may change the threshold distance from a first distance to a second distance. As another example, the user interface 306 may allow the wireless service provider employee to add and/or modify the BS location data 312. The wireless service provider employee may add respective locations of new macro base stations into the BS location 312 when the new macro base stations are added to the macro-network. The wireless service provider employee may modify the BS location data 312 when a macro base station is no longer operational or for some other reason.

The user interface 306 is operable to present data stored in the data storage 308 to a user, such as an employee of the wireless service provider. For instance, the user interface 306 may include a display that can present a listing of the BS location data 312. Other examples of the user interface 306 being used to enter data into the BSC or being used to present data to a user are also possible.

The program instructions 310 may comprise any of a variety of computer-readable program instructions executable by the processor 302. For instance, the program instructions 310 may include instructions that cause communications interface 304 to send to the given BS a message to query the given BS for the location of the given BS.

As an example, the processor 302 may execute the program instructions to send the query message after expiration of a timer of a given duration, such as 1 hour, 24 hours (i.e., one day), 168 hours (i.e., one week), or some other duration. Execution of these program instructions may include resetting the timer such that the processor 302 repeats execution of the program instructions each time the timer expires.

As another example, the processor 302 may execute the program instructions to send the query message in response to receiving a communication from the given BS (e.g., the first communication sent to the BSC 114 from the given BS or each time the given BS is attempting to carry out the particular BS function).

The program instructions 310 may include instructions that cause data storage 308 to store data that indicates the location of the given BS. The processor 302 may execute these program instructions in response to the communications interface 304 and/or the processor 302 receiving the data that indicates the location of the given BS. The received data may indicate a new location of the given BS or a location of the given BS as reported in a previous message sent to the communications interface 304.

The program instructions 310 may include instructions that cause the processor 302 to (i) compare the location of the given BS to the respective location of each of the one or more other base stations, (ii) determine whether the location of the given BS is at least the threshold distance from the respective locations of each of the one or more other base stations, and (iii) responsively cause the at least one parameter to be set to prevent the base station 102 from performing the particular base station function. The at least one parameter may be stored at the given base station 102 as (or as part of) the function parameters 218. Alternatively, or in combination, the at least one parameter may be stored at the BSC 114 as (or as part of) the function parameters 316.

The program instructions 310 may comprise instructions that cause the processor 302 to (i) compare the location of the given BS to the respective location of the one or more other base stations, (ii) determine that the location of the given BS is less than the threshold distance respectively from the respective location of at least one of the one or more other base stations, and (ii) responsively cause the at least one parameter to be set to allow the given base station 102 to perform the particular base station function.

In the case in which the at least one parameter is contained in the data storage 308 (e.g., the function parameters 316), execution of the program instructions for setting the at least one parameter may cause the data storage 308 to set the parameter. In the case in which the at least one parameter is contained in the data storage of the given BS (e.g., the function parameters 218), execution of the program instructions for setting the at least one parameter may cause the communications interface 304 to send to the given BS 102 a message that causes the given BS 102 to set the at least one parameter.

The base station location data 312 may comprise data that indicates a respective location for multiple base stations. For example, the base station location data 312 may comprise data that indicates the respective location of the one or more other base stations (e.g., base stations 108, 110, 112). A base station location may be represented by a latitude, a longitude, and an elevation. A base station location may be determined via a GPS receiver or via another means. Table 1 depicts exemplary location data for base stations 108, 110, 112.

TABLE 1

| BS | Base Station Location | |
|---|---|---|
|  | Latitude | Longitude |
| 108 | 42.04 | −87.42 |
| 110 | 42.20 | −87.31 |
| 112 | 42.55 | −87.65 |

As another example, the base station location data 312 may comprise data that indicates the location of one or more base stations that each may function independently as the given base station (e.g., base stations 102, 104, 106). In this way, for each of the given base stations, the BSC 114 may (i) determine the location of that given base station, and (ii) determine whether the location of that given base station is at least the threshold distance respectively from each of the one or more other base stations. If the given base station is at least the threshold distance respectively from each of the one or more other base stations, then the BSC 114 responsively sets at least one parameter associated with that given base station to prevent that given base station from performing the particular base station function. Otherwise, if the given base station is less than the threshold distance respectively from at least one of the one or more other base stations, then the BSC 114 responsively sets the at least one parameter associated with that given base station to allow that given base station to perform the particular base station function.

The threshold distance data 314 may comprise data that indicates a single threshold distance, such as the threshold distance 146. Alternatively, the threshold distance data 314 may comprise data that indicates a plurality of threshold distances, such as a threshold distance associated with BS 108 and a threshold distance associated with base stations 110, 112, or a respective threshold distance for each of the base stations 108, 110, 112. In this way, the determination whether the location of the given BS is greater than a threshold distance respectively from each of the one or more other base stations may include comparing the threshold distance associated with each respective base station to the distance between the location of the given BS and the location of that respective base station.

The threshold distance data 314 may be modified, such as by increasing the threshold distance or by decreasing the threshold distance. A wireless service provider that operates the BSC 114 may use the user interface 306 to modify the threshold distance data 314.

The function parameters 316 may comprise one or more parameters for each of the base stations controllable by BSC 114. In particular, the function parameters 316 may comprise one or more parameters for each of the base stations that may operate as the given BS (e.g., base stations 102, 104, 106). The one or more parameters for each of given base stations may be set to (i) prevent the respective given base stations from performing the particular base station function, and/or (ii) allow the respective given base stations to perform the particular base station function.

In accordance with the exemplary embodiment in which the BSC 114 includes the threshold distance data 314 and the function parameters 316, the base stations 102, 104, 106 may be arranged in a configuration such that the base stations 102, 104, 106 do not include the threshold distance data 216, the function parameters 218, and the program instructions for setting the at least one parameter to prevent the base station from performing the particular base station function or to allow the base station to perform the particular base station function. In this way, base stations 102, 104, 106 may be arranged to prevent a user from modifying the base station to allow the base station to perform the particular base station function when the wireless service provider would not want the base station to perform the particular base station function.

Additionally, in accordance with the exemplary embodiment in which the BSC 114 includes the BS location data 312, the BS location data 212 of the BS 102 does not have to include the location data of the one or more other base stations. In this way, the location of the given base station is compared to the locations of the one or more other base stations at the BSC 114 and not at the BS 102.

3. Exemplary Operation

Figure 4:
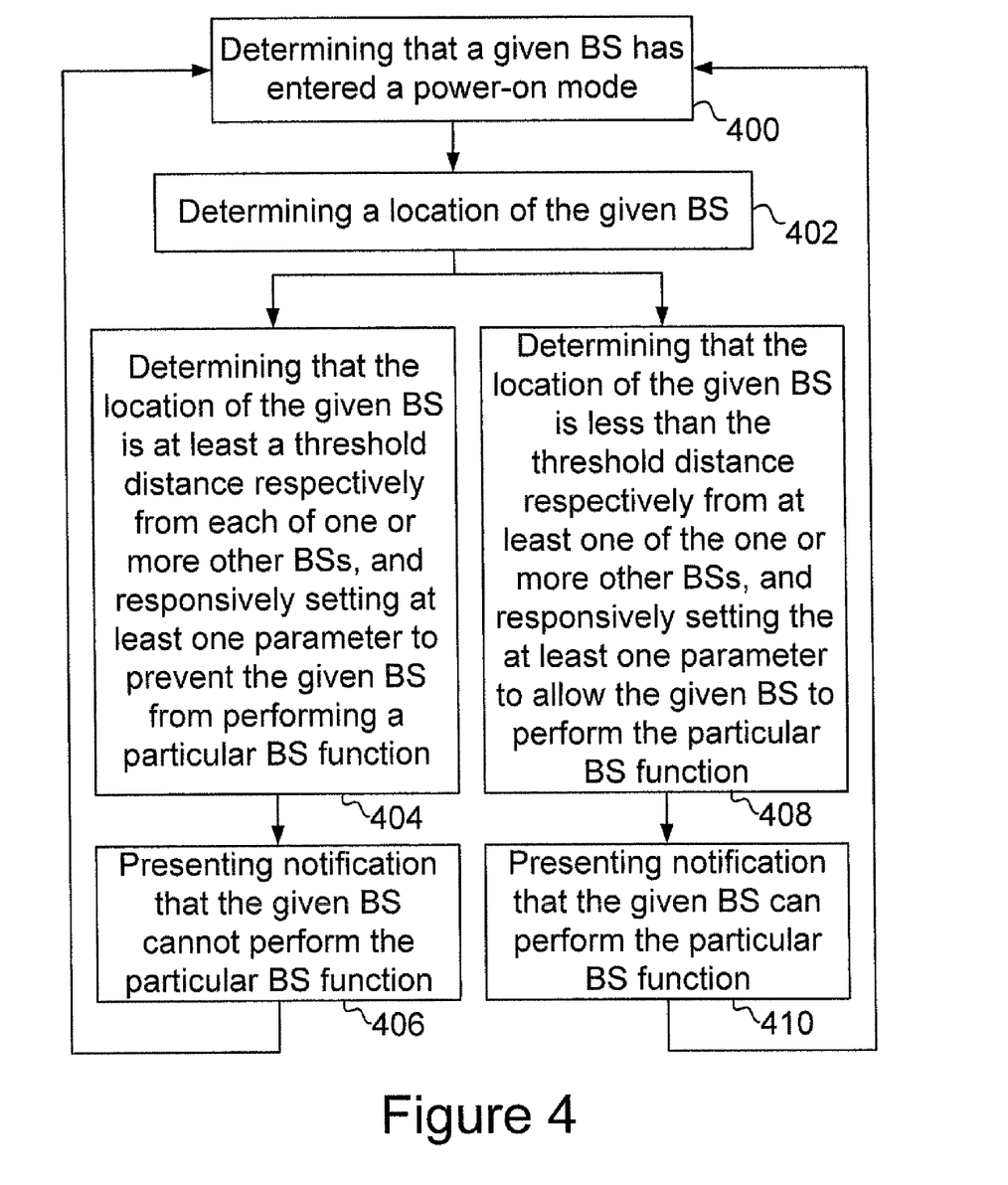
FIG. 4 is a flow chart depicting a set of functions that may be carried out with an exemplary embodiment of the present invention.

FIG. 4 is a flow chart provided to illustrate a set of functions that may be carried out in accordance with an exemplary embodiment of the present invention. As shown in FIG. 4, block 400 includes determining that a given BS (e.g., BS 102) has powered on (e.g., changed from a power off mode to a power on mode). The program instructions 214 may include instructions executable by the processor 202 so as to determine that BS 102 has powered on. The processor 202 may execute these program instructions in response to (i) the power cord 226 being plugged into a power outlet, (ii) a user toggling the power switch 224 so that power is supplied to the power section 226, or (iii) some other event.

Next, block 402 includes determining a location of the given BS. Determining the location of given BS may be carried out by various elements of the given BS and/or by various elements of system 100. For example, if the given BS is BS 102, determining the location of the given BS may include GPS receiver 206 determining the location of the BS 102. The GPS receiver 206 may determine the location of the BS 102 in accordance with any method currently known or later known to a person having ordinary skill in the art for using a GPS receiver to determine a location.

Each of the base stations 102, 104, 106 may determine their respective location using a respective GPS receiver. As an example, the determined base station locations may be represented via the decimal latitude and longitude values shown in Table 2.

TABLE 2

| BS | Base Station Location | |
|---|---|---|
|  | Latitude | Longitude |
| 102 | 41.88 | −87.64 |
| 104 | 41.95 | −87.66 |
| 106 | 41.88 | −87.67 |

Alternatively, the latitude and longitude of the determined base station locations may each be represented as a number of degrees, minutes, and seconds. For instance, the latitude and longitude of the location of BS 102 may be represented as 41° 52' 48" and −87° 38' 24," respectively. The determined locations may also include an elevation of the BS.

Determining the location of the given BS may include the processor 202 determining the location. The processor 202 may query the GPS receiver 206 for the location of given BS and, in response to the query, the GPS receiver 206 may send to the processor 202 a message containing data indicating the location of the given BS. As an example, the processor 202 may query the GPS receiver 206 in response to the processor determining that BS 102 has powered on. As another example, the processor 202 may query the GPS receiver 206 in response to the processor 202 receiving from the BSC 114 a message to query the processor 202 for the location of BS 102.

After the processor 202 and/or the GPS receiver 206 determine the location of the given BS, the processor 202 and/or the GPS receiver 206 may provide data storage 210 with data indicating the BS location for storage as (or as part of) the BS location data 212.

Determining the location of the given BS may include the BSC 114 determining the location. The BSC 114 may determine the location from a message sent to the BSC 114 from the given BS. Table 3 depicts exemplary data that may be included in such a message sent to the BSC 114. By way of example, if the given BS is BS 102, the BSC 114 may receive a message including data shown in the third row of Table 3. The data may include a BS identifier (e.g., an Internet Protocol (IP) address assigned to the BS), and a latitude and longitude indicating the location of the BS.

TABLE 3

| BS | Message | | |
|---|---|---|---|
|  | BS Identifier | Latitude | Longitude |
| 102 | 191.255.127.255 | 41.88 | −87.64 |
| 104 | 223.129.204.255 | 41.95 | −87.66 |
| 106 | 147.240.037.254 | 41.88 | −87.67 |

In Table 3, the BS identifiers are shown as IP addresses according to the IPv4 addressing scheme. Alternatively, the BS identifiers may be arranged as IP addresses according to the IPv6 addressing scheme or as some other type of identifier. The BSC 114 may use a BS identifier to determine an address of the BS location data 312 where the BS location data should be stored and/or for other reasons.

In the case in which the BSC 114 determines the location of the given BS, the BSC 114 may determine the locations of a plurality of base stations operable as the given base station. For example, the BSC 114 may determine the respective locations of base stations 102, 104, 106 and, thereafter, stored the determined locations within the base station location data 312.

In one respect, after determining the location of the given BS 102 at block 402, the function of block 404 may be carried out. Block 404 includes determining that the location of the given base station is at least a threshold distance respectively from each of the one or more other base stations, and responsively setting the at least one parameter to prevent the given BS from performing the particular base station function. Making the determination of block 404 may be carried out at the given BS 102 by the execution of program instructions at processor 202 and/or at the BSC 114 by the execution of program instructions at processor 302.

The program instructions executed at processor 202 and/or processor 302 may include instructions to calculate the distance between the location of the given BS and the respective location of each of the one or more other base stations. These program instructions may be arranged to calculate each distance using the formula:

$$\text{Distance} = \text{Cos}^{-1}[(\text{Sin } p * \text{Sin } a) + (\text{Cos } p * \text{Cos } a * \text{Cos}|\delta\lambda|)] * 111.23 \text{ km/Degree},$$

where p is the latitude of the location of the given BS, a is the latitude of the location of one of the one or more other base stations, and $|\delta\lambda|$ is the absolute value of the difference in the longitude of the location of the given BS and the longitude of the location of the one of the one or more other base stations.

For example, if the BS 102 is located at a location having a latitude of 41.88 and a longitude of −87.64 and if the BS 110 is located at a location having a latitude of 42.20 and a longitude of −87.31, then the distance between BS 102 and BS 110=Cos$^{-1}$ [(Sin 41.88*Sin 42.20)+(Cos 41.88*Cos 42.20*Cos|(−87.64)−(−87.31)|]*111.23 km/Degree=Cos$^{-1}$ [(0.667572*0.671721)+(0.744545*0.740805*0.999983)*111.23 km/Degree=0.405143 Degrees*111.23 km/Degree=45.064 km. Other exemplary arrangements for program instructions to calculate the distance between the location of the given BS and the respective location of each of the one or more other base stations are also possible.

Making the determination of block 404 may also include the processor 202 and/or the processor 302 executing program instructions to compare each calculated distance to the threshold distance 146 and to determine whether the location of the given BS is at least the threshold distance from the location of the other BS used to calculate the distance. For example, if the threshold distance 146 is 5.0 km and the distance between the BS 102 and the BS 110 is 45.064 km, then the program instructions are executable to determine that BS 102 is at least the threshold distance from BS 110.

After making the determination that the location of the given BS is at least the threshold distance respectively from each of the one or more other base stations, the BSC 114 and/or the given BS may responsively execute program instructions to set the at least one parameter to prevent the given BS from performing the particular BS function.

For example, if the BSC 114 makes the determination and the at least one parameter is stored within the function parameters 316, then the processor 302 may execute program instructions 310 that cause the at least one parameter to be set (or to remain set) to prevent the given BS from performing the particular BS function.

As another example, if the BSC 114 makes the determination and the at least one parameter is stored within the function parameters 218, then the processor 302 may execute program instructions that cause communications interface 304 to send to the BS 102 a message that causes the processor 202 to execute program instructions that cause the at least one parameter to be set (or to remain set) to prevent the BS 102 from performing the particular BS function.

As yet another example, if the BS 102 makes the determination and the at least one parameter is stored within the function parameters 218, then the processor 202 may execute program instructions 214 that cause the at least one parameter to be set (or to remain set) to prevent the BS 102 from performing the particular BS function.

As still yet another example, if the BS 102 makes the determination and the at least one parameter is stored within the function parameters 316, then the processor 202 may execute program instructions that cause communications interface 204 to send to the BSC 114 a message that causes the processor 302 to execute program instructions that cause the at least one parameter to be set (or to remain set) to prevent the BS 102 from performing the particular BS function.

In addition to or as an alternative to setting the at least one parameter to prevent the given BS from performing the particular BS function after making the determination of block 404, the processor 202 may execute program instructions that cause the BS 102 to perform and/or to stop performing a particular BS function after making the determination of block 404. For example, if a virtual private network (VPN) tunnel is established between BS 102 and the BSC 114 via the packet-data network 134, after making the determination of block 404, the processor 202 may execute program instructions that cause the BS 102 to tear down (i.e., end) the established VPN tunnel. At least one parameter in data storage may be set to prevent the BS 102 from establishing another VPN tunnel with the BSC 114 while the BS 102 is at least the threshold distance away from each of the one or more other base stations.

As another example, after making the determination at block 404, the processor 202 may execute program instructions that cause the BS 102 to stop transmitting an operational carrier and/or a pilot beacon. As yet another example, after making the determination at block 404, the processor 202 may execute program instruction that cause the BS 102 to disallow routing of certain data sessions (e.g., a voice call to the phone number *94). Other examples of the particular BS function that may be performed and/or stopped after making the determination of block 404 are also possible.

Next, block 406 includes presenting notification that the given BS cannot perform the particular base station function. The notification may be presented at the given BS, for example, via the user interface 204. For instance, the processor 202 may execute program instructions stored at the data storage 210 so as to cause the user interface 204 to present the notification visually via a display of the user interface 204 and/or to present the notification audibly via a loud speaker of the user interface 204. Other examples of presenting the notification at the given BS are also possible.

Alternatively or additionally, the notification that the given BS cannot perform the particular base station function may be presented at a mobile station. For example, if the given BS is BS 102 and MS 136 has requested the BS 102 to perform the particular BS function or some other BS function (such as registering the MS 136 at the BS 102), the BS 102 may send to MS 136 a message including data that indicates the BS 102 cannot perform the particular BS function. In response to receiving the message, the MS 136 can present the notification to a user of the MS 136. For example, the MS 136 may include computer-readable program instructions executable by a processor of MS 136 to cause a user interface of MS 136 to visually and/or audibly present the notification to a user of MS 136.

In another respect, after determining the location of the given BS 102 at block 402, the function of block 408 may be carried out. Block 408 includes determining that the location of the given BS is less than the threshold distance respectively from at least one of the one or more other base stations, and responsively setting the at least one parameter to allow the given BS to perform the particular BS function. Making the determination of block 408 may be carried out at the given BS 102 by the execution of program instructions at processor 202 and/or at the BSC 114 by the execution of program instructions at processor 302.

Making the determination of block 408 may include the processor 202 and/or the processor 302 executing program instructions to calculate the distance between the location of the given BS and the respective location of at least one of the one or more other base stations. The processor 202 and/or the processor 302 may then compare the calculated distance to the threshold distance 146 to determine whether the location of the given BS is less than the threshold distance from the at least one of the one or more other base stations.

If the location of the given BS 102 is not less than the threshold distance 146 respectively from the at least one of the one or more other base stations, then the processor 202 and/or the processor 302 may execute program instructions to (i) calculate the distance between the location of the given BS 102 and the respective location of another BS of the one or more other base stations, (ii) compare the calculated distance to the threshold distance 146, and (iii) determine whether the location of the given BS is less than the threshold distance respectively from the location of the other BS.

If the given BS 102 is less than the threshold distance 146 from the at least one of the one or more other base stations, then the given BS 102 and/or the BSC 114 responsively set the at least one parameter to allow the given BS 102 to perform the particular BS function.

For example, if the BSC 114 makes the determination and the at least one parameter is stored within the function parameters 316, then the processor 302 may execute program instructions 310 that cause the at least one parameter to be set (or to remain set) to allow the given BS to perform the particular BS function.

As another example, if the BSC 114 makes the determination and the at least one parameter is stored within the function parameters 218, then the processor 302 may execute program instructions that cause communications interface 304 to send to the BS 102 a message that causes the processor 202 to execute program instructions that cause the at least one parameter to be set (or to remain set) to allow the BS 102 to perform the particular BS function.

As yet another example, if the BS 102 makes the determination and the at least one parameter is stored within the function parameters 218, then the processor 202 may execute program instructions 214 that cause the at least one parameter to be set (or to remain set) to allow the given BS 102 to perform the particular BS function.

As still yet another example, if the BS 102 makes the determination and the at least one parameter is stored within the function parameters 316, then the processor 202 may execute program instructions that cause communications interface 204 to send to the BSC 114 a message that causes the processor 302 to execute program instructions that cause the at least one parameter to be set (or to remain set) to allow the given BS 102 to perform the particular BS function.

Next, block 410 includes presenting notification that the given BS can perform the particular base station function. This notification may be presented at the given BS, for example, via the user interface 204. For instance, the processor 202 may execute program instructions stored at the data storage 210 so as to cause the user interface 204 to present the notification visually via a display of the user interface 204 and/or to present the notification audibly via a loud speaker of the user interface 204. Other examples of presenting the notification at the given BS are also possible.

Alternatively or additionally, the notification that the given BS can perform the particular base station function may be presented at a mobile station. For example, if the given BS is BS 102 and MS 136 has requested the BS 102 to perform the particular BS function or some other BS function (such as registering the MS 136 at the BS 102), the BS 102 may send to MS 136 a message including data that indicates the BS 102 can perform the particular BS function. In response to receiving the message, the MS 136 can present the notification to a user of the MS 136. For example, the MS 136 may include computer-readable program instructions executable by a processor of MS 136 to cause a user interface of MS 136 to visually and/or audibly present the notification to a user of MS 136.

4. Conclusion

Exemplary embodiments of the present invention have been described above. Those skilled in the art will understand, however, that changes and modifications may be made to the embodiments described without departing from the true scope and spirit of the present invention, which is defined by the claims.

A benefit of the present invention is that by not allowing the given base station to perform the particular base station function, the given base station may be prevented from using radio spectrum that is not licensed to a wireless service provider that controls the given base station. In this way, a user of the given base station and the wireless service provider reduce the risk of being penalized for the unlicensed use of radio spectrum.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
determining a location of a given base station, wherein the given base station includes a movable femtocell base station;
determining that the location of the given base station is at least a threshold distance from each of one or more other base stations within a network that provides wireless service to a geographical area where a wireless service provider is licensed to provide the wireless service, and responsively setting at least one parameter so that the given base station prevents a mobile station from establishing a data session via the given base station while the location of the given base station is at least a threshold distance from each of the one or more other base stations within the network that provides the wireless service to the geographical area where the wireless service provider is licensed to provide the wireless service; and
presenting a notification that the given base station will not allow the mobile station to establish a data session,
wherein presenting the notification includes performing a function selected from the group consisting of (i) sending, to the mobile station from the given base station, a message including data that indicates the given base station will not allow the mobile station to establish a data session, and (ii) presenting, at the given base station, visual or audible notification that the given base station will not allow the mobile station to establish a data session.

2. The method of claim 1,
wherein presenting the notification includes presenting, at the mobile station, visual or audible notification that the given base station will not allow the mobile station to establish a data session in response to the given base station sending to the mobile station the message including data that indicates the given base station will not allow the mobile station to establish a data session.

3. The method of claim 1, further comprising:
storing in data storage at the given base station the at least one parameter; and
storing in data storage at a base station controller that controls the given base station (i) threshold data indicating the threshold distance, and (ii) location data indicating a respective location of each of the one or more other base stations,
wherein the base station controller carries out the functions of determining the location of the given base station, determining that the location of the given base station is at least the threshold distance from each of one or more other base stations, and responsively setting the at least one parameter so that the given base station prevents the mobile station from establishing a data session via the given base station.

4. The method of claim 3,
wherein the wireless service provider operates the base station controller,
the method further comprising:
changing the threshold data so as to increase the threshold distance or to decrease the threshold distance,
wherein the wireless service provider changes the threshold distance.

5. The method of claim 1,
wherein the given base station comprises a global positioning system receiver,
wherein determining the location of the given base station is carried out via the global positioning system receiver of the given base station,
the method further comprising:
at the given base station, detecting that the given base station has changed to a power-on mode, and responsively transmitting data indicating the location of the given base station to a base station controller,
wherein the base station controller carries out determining that the location of the given base station is at least the threshold distance from each of one or more other base stations.

6. The method of claim 1, further comprising:
after setting the at least one parameter to prevent the given base station from performing the particular base station function, determining a new location of the given base station; and
thereafter, determining that the new location of the given base station is less than the threshold distance from at least one of the one or more other base stations, and responsively setting the at least one parameter so that the given base station allows the mobile station to establish a data session via the given base station.

7. The method of claim 1,
wherein the given base station comprises data storage, a processor, and a global positioning system receiver, and wherein determining the location of the given base station includes the processor receiving from the global positioning system receiver data indicating the location of the given base station, the method further comprising:

storing at the data storage (i) the at least one parameter, (ii) data indicating the threshold distance, and (iii) program instructions executable by the processor to carry out the functions of determining the location of the given base station, determining that the location of the given base station is at least the threshold distance from each of the one or more other base stations, and responsively setting the at least one parameter so that the given base station prevents the mobile station from establishing a data session via the given base station.

8. The method of claim 1, wherein each of the one or more other base stations is a macro base station, the method further comprising:

determining a location of each of one or more other femtocell base stations; and for each of the one or more other femtocell base stations:

(i) determining whether the location of that femtocell base station is at least the threshold distance from each of one or more macro base stations;

(ii) if that femtocell base station is at least the threshold distance respectively from each of one or more macro base stations, then responsively setting at least one parameter associated with that femtocell base station so that that femtocell base station prevents the mobile station from establishing a data session via that femtocell base station; and (iii) if that femtocell base station is less than the threshold distance from at least one of the one or more macro base stations, then responsively setting the at least one parameter associated with that femtocell base station so that that femtocell base station allows the mobile station to establish a data session via that femtocell base station.

9. The method of claim 1, wherein the one or more other base stations comprises at least two base stations.

10. The method of claim 1, wherein setting the parameter further causes the given base station to prevent the mobile station from performing a registration function that allows the mobile station to notify a home agent of the location of the mobile station.

11. The method of claim 1, wherein setting the parameter further prevents the given base station from transmitting an operational carrier with traffic channels for voice communications, data communications, or voice and data communications.

12. The method of claim 1, wherein setting the parameter further prevents the given base station from transmitting a pilot beacon from the given base station.

13. The method of claim 1, further comprising:

tearing down, by the given base station in response to determining that the location of the given base station is at least the threshold distance from each of one or more other base stations, a virtual private network (VPN) tunnel established over the Internet between the given base station and a VPN terminator.

14. The method of claim 1, further comprising:

determining a second location of the given base station; and determining that the second location of the given base station is less than a threshold distance from at a base station within the network and responsively setting the at least one parameter so that the given base station allows the mobile station to establish a data session via the given base station while the given base station is less than the threshold distance away from the base station within the network.

15. The method of claim 14, further comprising:

connecting, by the given base station to an Internet Service Provider, by way of a router and a modem connected between the given base station and the Internet Service Provider, wherein the given base station is connected to the router.

16. The method of claim 1, wherein the one or more other base stations includes at least a first base station and a second base station, wherein the threshold distance includes at least a first threshold distance and a second threshold distance different than the first threshold distance, and wherein the first threshold distance corresponds to the first base station and the second threshold distance corresponds to the second base station.

17. A base station controller comprising:

a communications interface for communicating with a given base station, wherein the given base station includes a movable femtocell base station;

a processor; and data storage containing:

(i) data indicating a threshold distance, (ii) data indicating a respective location of one or more other base stations within a network that provides wireless service to a geographical area where a wireless service provider is licensed to provide wireless service, and (iii) non-transitory computer-readable program instructions executable by the processor to determine that a location of the given base station is at least the threshold distance from each of the one or more other base stations within the network that provides wireless service to the geographical area where the wireless service provider is licensed to provide the wireless service, and to responsively cause at least one parameter to be set so that the given base station prevents a mobile station from establishing a data session via the given base station while the location of the given base station is at least a threshold distance from each of the one or more other base stations within the network that provides the wireless service to the geographical area where the wireless service provider is licensed to provide the wireless service, wherein the communications interface is configured to send to the given base station a message that causes the given base station to (a) set a parameter so that the given base station prevents the mobile station from establishing a data session while the location of the given base station is at least a threshold distance from each of the one or more other base stations, and (b) present a notification, and wherein the notification includes at least one of (a) a message sent to the mobile station that includes data indicating the given base station will not allow the mobile station to establish a data session, and (b) a visual or audible notification at the given base station that indicates that the given base station will not allow the mobile station to establish a data session.

18. The base station controller of claim 17, wherein the at least one parameter is stored by data storage located at the given base station, and wherein execution of the program instructions to responsively cause the at least one parameter to be set so that the given base station prevents a mobile station from establishing a data session via the given base station causes the communications interface to transmit to the given base station a message that causes the given base station to set the at least one parameter so that the given base station prevents a mobile station from establishing a data session via the given base station.

19. The base station controller of claim 17,
wherein the computer-readable program instruction include instructions executable by the processor to (i) determine a new location of the given base station, and (ii) determine that the new location of the given base station is less than the threshold distance from at least one of the one or more other base stations, and responsively cause setting of the at least one parameter so that the given base station allows the mobile station to establish a data session via the given base station.

20. The base station controller of claim 17,
wherein the data storage further contains the at least one parameter.

21. A base station comprising:
a movable femtocell base station;
  a global positioning system receiver to determine a location of the femtocell base station;
a processor;
  data storage containing: (i) at least one parameter settable so that the femtocell base station prevents a mobile station from establishing a data session via the femtocell base station, and settable so that the femtocell base station allows the mobile station to establish a data session via the femtocell base station, and (ii) non-transitory computer-readable program instructions executable by the processor to set the parameter and to present a notification that the femtocell base station will not allow the mobile station to establish a data session; and
  a communications interface to (i) transmit data indicating the location of the femtocell base station to a base station controller that determines whether the location of the femtocell base station is at least a threshold distance from each of one or more other base stations within a network that provides wireless service to a geographical area where a wireless service provider is licensed to provide the wireless service, (ii) receive, from the base station controller when the location of the femtocell base station is at least a threshold distance from each of the one or more other base stations, a message that causes the processor to execute the program instructions to set the parameter so that the femtocell base station prevents the mobile station from establishing a data session via the femtocell base station, and (iii) receive, from the base station controller when the location of the femtocell base station is less than the threshold distance from at least one of the one or more other base stations, a message that causes the processor to execute the program instructions to set the at least one parameter so that the femtocell base station allows the mobile station to establish a data session via the femtocell base station,
  wherein the notification includes at least one of (i) a message sent to the mobile station by the communication interface, wherein the message includes data that indicates the femtocell base station will not allow the mobile station to establish a data session, and (ii) a visual or audible notification presented by the femtocell base station, wherein the visual or audible notification indicates that the femtocell base station will not allow the mobile station to establish a data session.

22. The base station of claim 21, wherein the program instructions include instructions that cause the processor to detect that the femtocell base station has changed to a power-on mode and to responsively cause the communications interface to transmit the data indicating the location of the femtocell base station to the base station controller.

23. The base station of claim 21, further comprising:
a user interface,
  wherein, while the at least one parameter is set so that the femtocell base station prevents the mobile station from establishing a data session, the user interface presents a notification that the femtocell base station will not allow the mobile station to establish a data session, and
  wherein, while the at least one parameter is set so that the femtocell base station allows the mobile station to establish a data session, the user interface presents a notification that the femtocell base station will allow the mobile station to establish a data session.

24. The base station of claim 23,
wherein the user interface comprises a light emitting diode to visually present the notification that the femtocell base station will not allow the mobile station to establish a data session.

25. The base station of claim 23,
wherein the user interface comprises a loud speaker to audibly present the notification that the femtocell base station will not allow the mobile station to establish a data session.

26. The base station of claim 21,
wherein the message is addressed to the mobile station, and
wherein in response to receiving the message addressed to the mobile station, the mobile station presents notification that the femtocell base station will not allow the mobile station to establish a data session.

* * * * *